United States Patent
Markow

(10) Patent No.: US 8,679,272 B2
(45) Date of Patent: Mar. 25, 2014

(54) RUN-FLAT PNEUMATIC TIRE ASSEMBLY AND METHOD

(71) Applicant: Bridgestone/Firestone North American Tire, LLC, Nashville, TN (US)

(72) Inventor: Edward G. Markow, Oakdale, NY (US)

(73) Assignee: Bridgestone Americas Tire Operations, LLC, Nashville, TN (US)

( * ) Notice: Subject to any disclaimer, the term of this patent is extended or adjusted under 35 U.S.C. 154(b) by 0 days.

(21) Appl. No.: 14/018,402

(22) Filed: Sep. 4, 2013

(65) Prior Publication Data
US 2014/0000790 A1  Jan. 2, 2014

Related U.S. Application Data

(62) Division of application No. 12/364,951, filed on Feb. 3, 2009, now Pat. No. 8,561,661.

(51) Int. Cl.
*B29D 30/06* (2006.01)

(52) U.S. Cl.
USPC ........ 156/110.1; 156/121; 156/123; 156/126; 156/394.1; 156/396; 156/421.6; 156/143; 156/144; 156/195; 156/425; 152/516; 152/520; 152/155; 152/156; 152/157; 152/158

(58) Field of Classification Search
USPC ........... 156/110.1, 121, 123, 126, 394.1, 396, 156/421.6, 143, 144, 195, 425; 152/516, 152/520, 155, 156, 157, 158
See application file for complete search history.

(56) References Cited

U.S. PATENT DOCUMENTS

| | | | | |
|---|---|---|---|---|
| 572,738 A * | 12/1896 | Wilde | ........................ | 152/288 |
| 574,015 A * | 12/1896 | Woodhouse | .................. | 152/156 |
| 1,033,513 A * | 7/1912 | Aebli | ............................ | 152/156 |
| 1,213,557 A * | 1/1917 | Trotter | ......................... | 152/261 |
| 1,413,872 A * | 4/1922 | Perry | ............................ | 152/288 |
| 1,856,983 A * | 5/1932 | Blazquez | ..................... | 152/288 |
| 3,734,157 A | 5/1973 | Roque | | |
| 4,111,249 A | 9/1978 | Markow | | |
| 4,265,290 A | 5/1981 | Jackson | | |
| 4,318,434 A | 3/1982 | Markow | | |
| 4,392,522 A | 7/1983 | Bschorr | | |
| 4,428,411 A | 1/1984 | Markow et al. | | |
| 4,456,048 A | 6/1984 | Markow et al. | | |
| 4,459,167 A | 7/1984 | Markow et al. | | |
| 4,673,014 A | 6/1987 | Markow | | |
| 4,681,147 A | 7/1987 | Hugele | | |
| 4,708,186 A | 11/1987 | Kopsco et al. | | |
| 4,734,144 A | 3/1988 | Markow | | |
| 4,794,966 A | 1/1989 | Markow | | |
| 5,800,643 A * | 9/1998 | Frankowski | .................. | 152/156 |
| 5,879,484 A | 3/1999 | Spragg et al. | | |
| 6,112,791 A | 9/2000 | Spragg et al. | | |
| 6,117,258 A | 9/2000 | Spragg et al. | | |

(Continued)

FOREIGN PATENT DOCUMENTS

GB  2189749  11/1987

*Primary Examiner* — Timothy Kennedy

(57) ABSTRACT

A run-flat pneumatic tire assembly includes a pneumatic tire having an elastomeric casing and a tire cavity formed therein. A longitudinally-extending and approximately planar length of strip material is helically arranged within the tire cavity to pre-stress the length of strip material for usage of the pneumatic tire during under-inflated and non-inflated conditions. A method of making a run-flat pneumatic tire assembly is also included.

20 Claims, 9 Drawing Sheets

(56) References Cited

U.S. PATENT DOCUMENTS

| | | |
|---|---|---|
| 6,148,885 A | 11/2000 | Spragg et al. |
| 6,321,808 B1 | 11/2001 | Spragg et al. |
| 6,363,986 B1 | 4/2002 | Spragg et al. |
| 6,405,773 B1 | 6/2002 | Vossberg et al. |
| 6,420,005 B1 | 7/2002 | Spragg et al. |
| 6,436,215 B1 | 8/2002 | Spragg et al. |
| 6,439,288 B1 | 8/2002 | Spragg et al. |
| 6,460,586 B1 | 10/2002 | Spragg et al. |
| 6,470,937 B1 | 10/2002 | Spragg et al. |
| 6,598,634 B1 | 7/2003 | Koch et al. |
| 2009/0314403 A1* | 12/2009 | Tanno .......................... 152/157 |

* cited by examiner

RUN-FLAT PNEUMATIC TIRE ASSEMBLY AND METHOD

This is a divisional of U.S. patent application Ser. No. 12/364,951 filed on Feb. 3, 2009, which is hereby incorporated herein by reference in its entirety.

The subject matter of the present document broadly relates to the art of run-flat pneumatic tires and, more particularly, to a pneumatic tire and structural insert assembly that is adapted for run-flat operation as well as a method of making the same.

INCORPORATION BY REFERENCE

The entire disclosure of U.S. Pat. Nos. 4,428,411; 4,459,167; and 6,405,773 are hereby incorporated herein by reference.

BACKGROUND

One area of tire technology that has been developed during the last few decades is the concept of a pneumatic tire that is capable of operating in an under-inflated or non-inflated condition. In such types of pneumatic tires, which are often referred to in the industry as "run-flat" tires, it is generally desired for an under-inflated or non-inflated tire to support a vehicle during operation for a predetermined minimum number of miles and at speeds up to a predetermined maximum speed of operation. The advantages of such a tire in safety and convenience are well documented.

One example of a run-flat tire construction that has been developed over the years is the band-reinforced radial tire, which was invented by the inventor of the present application. Typically, a banded run-flat tire is a pneumatic radial tire having a casing with a crown and sidewalls extending from the crown on either side to annular beads which, in a conventional way, are used to mount the tire in a sealed relationship on the rim of a wheel. The band element is embedded in the crown of the tire underlying the tread during the manufacture of the tire while the tire is in a green or uncured state. In some cases, the band element may be a thin structural ring of high-strength steel or a fiber/epoxy composite, such as is disclosed in U.S. Pat. Nos. 4,111,249; 4,318,434; 4,456,048; 4,734,144; 5,879,484; 6,112,791; 6,117,258; 6,148,885; 6,321,808; 6,363,986; 6,405,773; 6,420,005; 6,436,215; 6,439,288; 6,460,586; 6,470,937 and 6,598,634, for example. In other cases, the band element may take the form of a helical structure or coiled member, such as is disclosed in U.S. Pat. Nos. 4,673,014; 4,708,186 and 4,794,966, for example.

Another example of a run-flat tire construction involves the use of a finished or cured tire of an otherwise standard construction. In this type of run-flat tire construction, a pre-curved, helical or coil-like structural element is formed. The pre-curved coil-like structure is then inserted into the inner cavity of the finished tire in a suitable manner, such as by winding up the helix to reduce the outside diameter thereof or by separating an end of the coil-like structure and feeding the structure into the inner cavity due to relative rotation between the structure and the tire. Such a run-flat tire construction is, for example, disclosed in U.S. Pat. Nos. 4,428,411 and 4,459,167.

With reference to such known constructions, FIG. 13 of the present application graphically illustrates relative stress levels that would be expected to occur in known run-flat tire constructions that rely upon the use of pre-curved bands. The general outline of a pre-curved band is indicated by reference number 50 in FIG. 13. Pre-curved band 50 is shown undergoing the deflection expected during use, with a ground contact patch 52 being formed along a road or other surface 54. Additionally, FIG. 13 illustrates relative stress levels that would be expected to be experienced by the pre-curved band during such use. Inner surface stresses are represented by line 56 and outer surface stresses are represented by line 58 with compression being represented by line portions disposed radially-inwardly from band 50 and tension being represented by line portions disposed radially-outwardly from band 50.

It has been observed that conventional pre-curved bands operating within an under-pressurized or non-pressurized tire will normally have the capability (i.e., durability) to exceed a 100 mile performance target. However, it has also been recognized that such known pre-curved bands may provide less than the desired level of performance during normal, pressurized operation of the tire. It will be appreciated that during normal, pressurized operation, a pre-curved band could be subjected to cyclic flexing and corresponding cyclic variation in stresses many tens of millions of times to reach an 80,000 mile performance target.

It is believed that one reason for the less than optimal level of performance of known pre-curved bands during pressurized operation involves the relative variation in stresses to which known bands are subjected during use. That is, it has been determined that the curvature of pre-curved bands forward and aft of the ground contact area results in relatively low stresses being included in these fore and aft areas. In FIG. 13, pre-curved band 50 would rotate in the direction of arrow RT with areas forward of ground contact patch 52 being indicated by reference characters FWD and areas aft of ground contact patch 52 being indicated by reference characters AFT. It has also been determined, however, that while a given portion of a pre-curved band is disposed within the ground contact area, the pre-curved band is flexed from the initially pre-curved condition into an approximately flat state. During this approximately flat condition, the stresses within the pre-curved band may be substantially higher than the relatively low stresses in the fore and aft areas. What's more, if a positive obstacle is encountered by the tire, the resulting stresses in the pre-curved band at the ground contact area will be further increased.

Furthermore, it is well understood that tension/compression-type cyclic loading can accelerate the decrease in performance of load bearing members, such as may be due to material fatigue, for example. It will be recognized from FIG. 13 that in areas forward of ground contact patch 52, stresses along inner surface 56 of pre-curved band 50 are due to compression and that stresses along outer surface 58 are due to tension. As pre-curved band 50 approaches ground contact patch 52, however, an area of deflection 60 is reached at which the load conditions are reversed and stresses along inner surface 56 are due to tension with stresses along outer surface 58 being due to compression. As pre-curved band 50 exits ground contact patch 52, another area if deflection 62 is reached in which the load conditions are again reversed such that stresses along the point on inner surface 56 are again due to compression and stresses at the corresponding point on the outer surface are again due to tension. As such, known pre-curved bands are typically exposed to a cyclic load condition during each rotation of tire and it is believed that such cyclic loading may contribute to any decreased performance of such pre-curved bands.

Although known run-flat pneumatic tire constructions generally operate satisfactorily, the desire remains to increase performance (e.g., run-flat mileage, pressurized mileage and maximum speed of run-flat operation) and reduce manufacturing costs. As such, the subject concept seeks to provide these and other benefits and/or improvements over known run-flat pneumatic tire constructions.

BRIEF DESCRIPTION

A run-flat pneumatic tire assembly in accordance with the subject matter of the present disclosure is provided that includes a pneumatic tire and a pre-stressed structural insert. The elastomeric casing is disposed circumferentially about an axis and includes a crown portion and a pair of axially-spaced sidewalls extending radially inwardly from along the crown portion. The crown portion includes an outer surface and an inner surface that at least partially defines a tire cavity. The pre-stressed structural insert including a longitudinally-extending and approximately planar length of strip material having first and second longitudinally-extending sides defining a strip material thickness and opposing longitudinally-extending edges defining a strip material width. The length of strip material is disposed within the tire cavity in a helical arrangement such that the first side is facing outwardly toward the inner surface of the crown portion. The structural insert is pre-stressed due to at least the helical arrangement of the length of strip material within the tire cavity. This pre-stressed arrangement establishes a theoretical neutral plane along said length of strip material between the first and second sides thereof with the first side of the length of strip material being in tension and the second side of the length of strip material being in compression.

A run-flat pneumatic tire according to the foregoing paragraph is also provided in which the length of strip material can be formed from a plurality of strand elements and a matrix material that at least partially encapsulates the plurality of strand elements.

A run-flat pneumatic tire according to the foregoing paragraph is further provided in which a non-zero percentage of the plurality of strand elements can have a lengthwise portion that extends at a non-zero angle with respect to the neutral plane thereby minimizing formation of matrix-only planes that extend in approximate alignment with the neutral plane.

A method of making a run-flat pneumatic tire assembly in accordance with the subject matter of the present disclosure is provided that includes providing a pneumatic tire. The pneumatic tire includes an elastomeric casing having a crown and opposing sidewalls. The crown includes an outer surface and an inner surface that at least partially defines a tire cavity. The method also includes forming a longitudinally-extending and approximately-planar length of strip material having first and second longitudinally-extending sides defining a strip material thickness and opposing longitudinally-extending edges defining a strip material width. The method further includes inserting the length of strip material into the tire cavity in a helical arrangement such that the first longitudinally-extending side is facing outwardly toward the inner surface of the crown portion and thereby forming a structural insert that is pre-stressed due at least in part to the helical arrangement of the approximately planar length of strip material.

A method according to the foregoing paragraph is also provided in which the action of forming the longitudinally-extending and approximately-planar length of strip material can include gathering the plurality of strand elements into a bundle and forming the bundle into a cross-sectional shape having the strip material thickness and the strip material width.

A method according to the foregoing paragraph is also provided in which the action of forming the longitudinally-extending and approximately-planar length of strip material can include twisting the bundle of the plurality of strand elements such that a non-zero percentage of the plurality of strand elements have a lengthwise portion with a directional component extending in approximate alignment with the strip material thickness.

DETAILED DESCRIPTION

Figure 1:
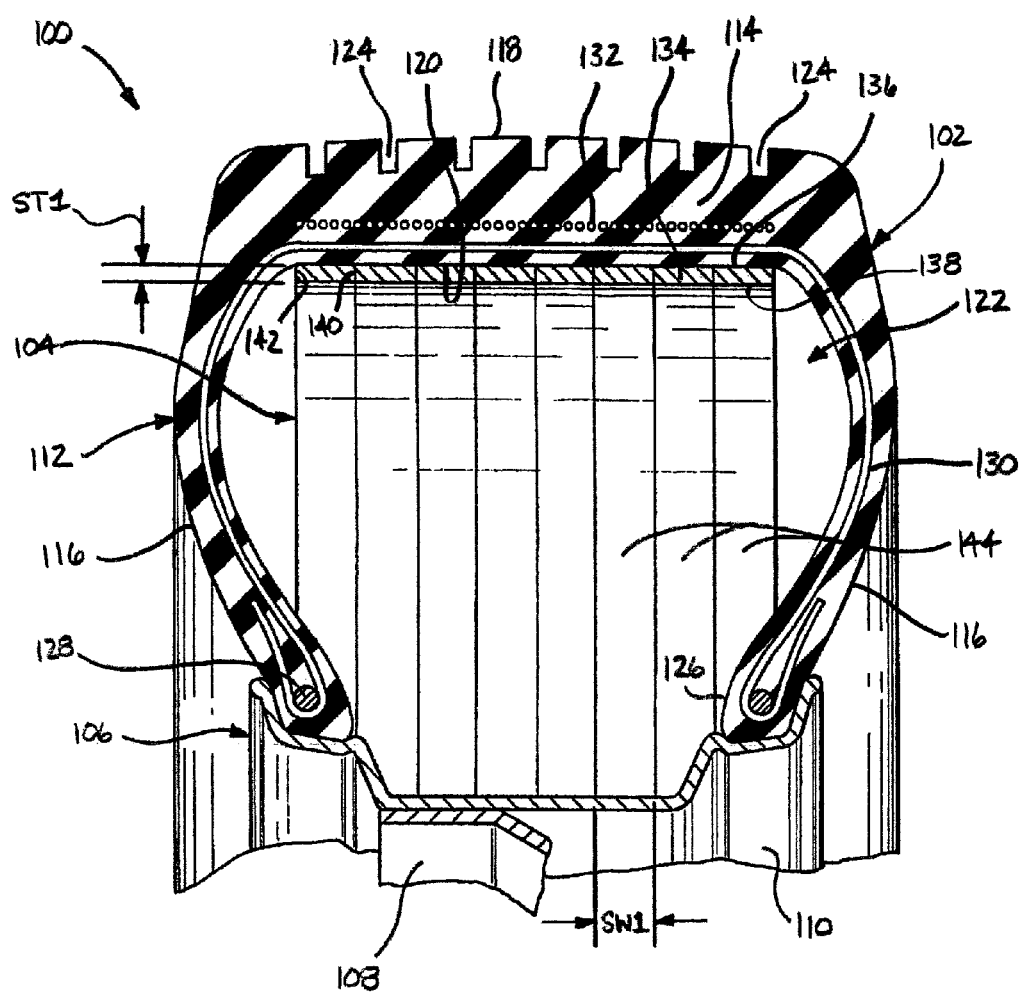
FIG. 1 is a diagrammatic cross-sectional side view of one exemplary embodiment of a pneumatic tire and structural insert assembly in accordance with the subject matter of the present document.

Turning now to the drawings wherein the showings are provided for the purpose of illustrating exemplary embodiments of the subject matter of the present disclosure and which drawings are not intended to be limiting, FIG. 1 illustrates a run-flat pneumatic tire assembly 100 that includes a pneumatic tire 102 and a structural insert 104 adapted to permit operation of the pneumatic tire in an under-inflated or non-inflated condition. It will be appreciated that the pneumatic tire can be of any suitable type, kind, construction and/or configuration. Additionally, the pneumatic tire can be formed from any suitable material or combination of materials, such as cured rubber or cast polyurethane, for example.

In the exemplary arrangement shown in FIG. 1, pneumatic tire 102 is shown mounted on a wheel 106, which can be of any suitable type, kind, construction and/or configuration, such as conventional arrangement having a drop center hub 108 welded to a circumferentially-extending rim 110. Tire 102 extends circumferentially about an axis (not shown) and includes an elastomeric casing 112 that has a crown portion 114 and axially-spaced sidewalls 116 that extend radially inwardly from along crown portion 114. The crown portion includes an outer surface 118 and an inner surface 120 that at least partially defines a tire cavity 122. Grooves 124 can be provided along outer surface 118 of crown portion 114 in any desired pattern or configuration to form a tire tread, as is well known in the art.

As indicated above, pneumatic tire 102 can be of any suitable type, kind, construction and/or configuration. For example, in the exemplary arrangement shown in FIG. 1, pneumatic tire 102 includes bead portions 126 that are adapted to seat in an air-tight relationship along rim 110, such as when pneumatic tire 102 is mounted on wheel 106. Bead portions 126 can be reinforced with annular cords or wires 128 in a conventional manner. Radial tires, as is well known, include one or more plies containing a multiplicity of closely spaced radial reinforcing cords or wires in the sidewalls of the tires. In the exemplary arrangement in FIG. 1, sidewalls 116 are shown as being reinforced by weftless radial plies or elements 130. Further reinforcement of the tire can be provided by one or more annular belts, such as belt 132 extending circumferentially along crown portion 114, for example. Elements 130 and belt 132 can be fabricated of any suitable material or combination of materials, such as steel wires or suitable textile fibers, for example, as is well known in the art. When mounted on a wheel, pneumatic tire 102 can be inflated through a conventional valve (not shown) that is operatively connected with tire cavity 122, such as through rim 110 of wheel 106, for example.

Structural insert 104 is formed from a longitudinally-extending and approximately-planar length of strip material 134 that is helically arranged within the tire cavity of the associated pneumatic tire. Preferably, length of strip material 134 is a generally straight and approximately flat strip of material. Length of strip material 134 includes first and second longitudinally extending sides 136 and 138 that define a strip material thickness, which thickness is represented in FIG. 1 by dimension ST1. Length of strip material 134 also includes opposing, longitudinally-extending edges 140 and 142 that define a strip material width, which width is represented in FIG. 1 by reference dimension SW1.

In the exemplary arrangement shown in FIG. 1, length of strip material 134 is helically arranged within tire cavity 122 such that first side 136 is disposed in facing relation to inner surface 120 of crown portion 114. In such a helical arrangement, length of strip material 134 is formed into a plurality of coils or loops 144 such that the full length of strip material fits within the tire cavity of the associated pneumatic tire. In the exemplary arrangement shown in FIG. 1, the edges of adjacent coils are disposed in close relation for abutting engagement with one another such that minimal gaps are formed between the adjacent coils.

Figure 2:
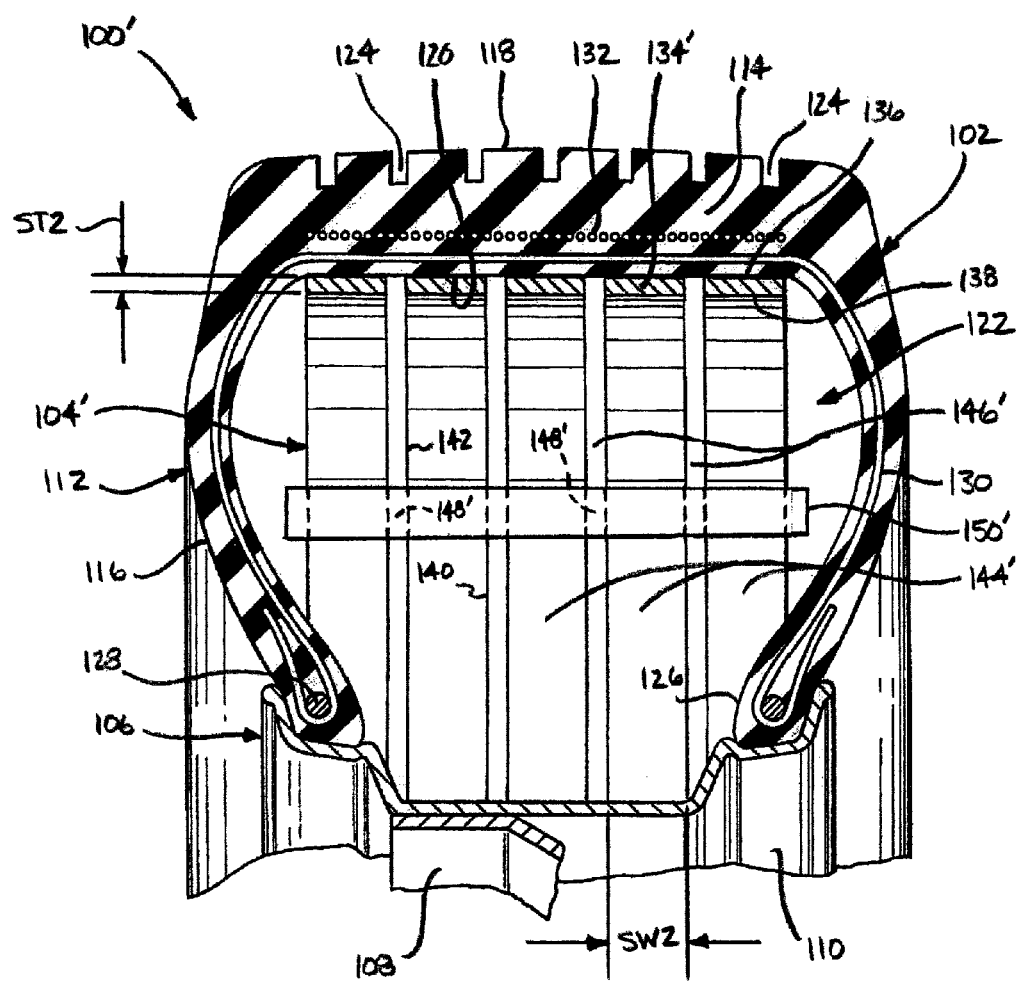
FIG. 2 is a diagrammatic cross-sectional side view of another exemplary embodiment of a pneumatic tire and structural insert assembly in accordance with the subject matter of the present document.

An alternate embodiment of a run-flat pneumatic tire 100' is shown in FIG. 2 in which a structural insert 104' is shown disposed within pneumatic tire 102. It will be appreciated that structural insert 104' is generally similar to structural insert 104 discussed above with regard to FIG. 1. As such, like features and/or elements in FIG. 2 will be identified by identical numbers to those used in FIG. 1 and new or different features and/or elements in FIG. 2 will be identified by primed (') reference numbers.

Figure 9:
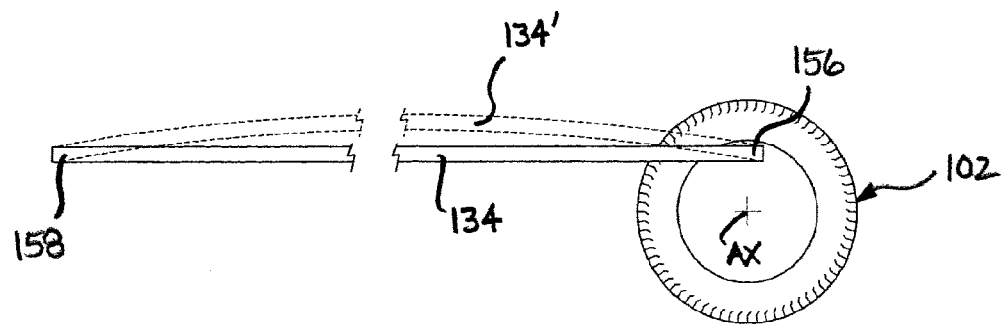
FIGS. 9-11 diagrammatically represent one portion of an exemplary method of installing a length of strip material into a pneumatic tire for use as a structural insert in accordance with the subject matter of the present document.

More specifically, structural insert 104' is also formed from a longitudinally-extending and approximately-planar length of strip material 134' that is helically arranged within the tire cavity of the associated pneumatic tire. While length of strip material 134' (as well as length of strip material 134) is preferably formed as a generally straight and approximately flat strip of material, the length of strip material could alternately have some amount of curvature in a free or otherwise unflexed condition, such as is schematically represented in FIG. 9, for example. Also, structural insert 134' is shown as differing from structural insert 134 in both thickness and width, as is represented by reference dimensions ST2 and SW2, respectively, as well as in overall length (not shown) which results in a reduced number of loops or coils formed within the tire cavity.

Length of strip material 134' is also helically arranged within tire cavity 122 such that first side 136 is disposed in facing relation to inner surface 120 of crown portion 114. In such a helical arrangement, length of strip material 134' is formed into a plurality of coils or loops 144' such that the full length of strip material fits within the tire cavity of the associated pneumatic tire. In the exemplary arrangement shown in FIG. 2, the edges of adjacent coils are disposed in axially-spaced relation to one another such that a single helical groove extends along the length of strip material. The single helical groove forms axially-spaced gaps 146' between edges of adjacent coils.

One or more spacer elements 148' can optionally be included, such as to evenly space adjacent coils during installation and/or to maintain the axially-spaced alignment during subsequent assembly processes. The one or more spacer elements can be provided in any suitable form, arrangement and/or configuration. As one example, a plurality of individual spacer elements could be installed within the helical groove at various circumferential and/or axial positions therealong. As another example, one or more spacer members 150' could optionally be provided that include a plurality of spacer elements extending therefrom. In such an arrangement, the spacer elements would preferably be spaced apart from one another a distance approximately equal to the strip material width. Though only one spacer member 150' is shown in FIG. 2, it will be appreciated that any suitable number of two or more spacer members could be used, such as being circumferentially spaced from one another along second side 138 of structural insert 104, for example. As one example, the spacer members could be positioned about 30 degrees apart around the inner circumference of the structural insert. What's more, spacer elements 148' and/or spacer members 150' can be formed from any suitable material or combination of materials, such as a PVC plastic or other such thermoplastic material, for example. And, the spacer elements and/or spacer members can be temporarily installed for assembly purposes or can be adhesively or otherwise secured into place in a permanent manner.

In order to maintain a pneumatic tire in an operational state after the tire has become under-pressurized or even non-pressurized, a high-strength structural support element (e.g., structural inserts 104 and 104') can be installed within an existing pneumatic tire (e.g., tire 102), such as a finished and fully-cured rubber radial tire, for example. In the present case, it is expected that a pneumatic tire will be capable of operating at normal deflection under approximately one-half the normal operating pressure of the tire while retaining all of the desired performance and handling characteristics, when fitted with a structural support element in accordance with the present disclosure. As illustrated above, such a high-strength structural support element will preferably be installed within the cavity of the tire casing such that the structural element is disposed in approximately coaxial relation to the crown portion of the tire casing.

Figure 3:
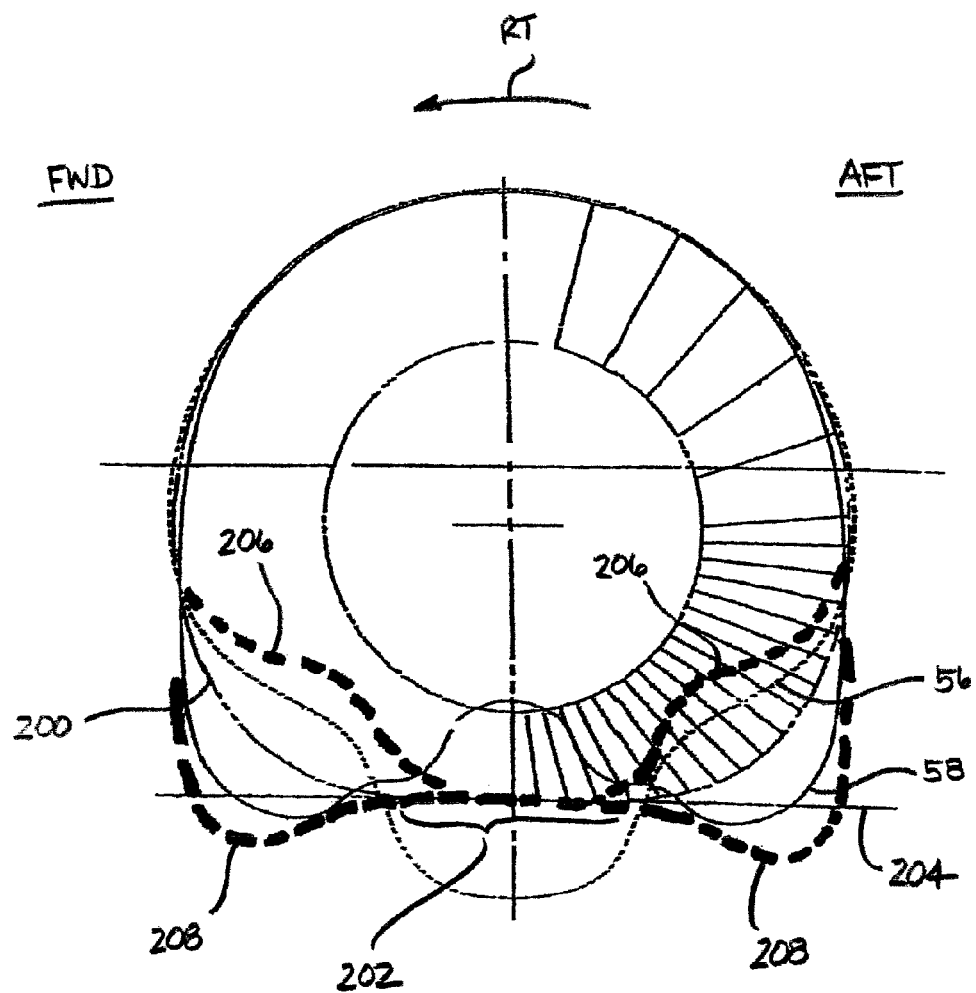
FIG. 3 is a graphical representation of a run-flat pneumatic tire in accordance with the subject matter of the present document illustrating exemplary stresses experienced during run-flat operation.

Additionally, such a high-strength structural support element will preferably be pre-stressed when installed into the tire cavity, such as, for example, by providing a longitudinally-extending and approximately planar length of strip material and inserting the same into a tire cavity in a helical arrangement. As illustrated in FIG. 3, it is expected that the use of the structural insert in the pre-stressed condition will greatly reduce the relative stresses in the ground contact area and thereby significantly increase pressurized performance of the structural insert in comparison with known pre-curved bands.

Figure 10:
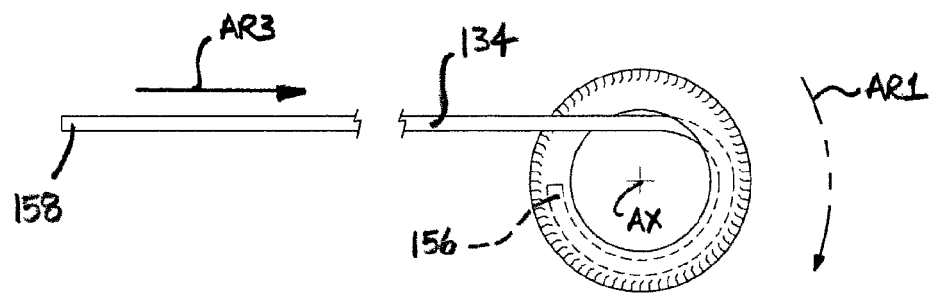

With further reference to FIG. 3, a high-strength structural support element in accordance with the present disclosure can be approximately flat (or, in some cases, slightly curved) prior to installation but will be highly flexed when installed in a helical arrangement within the tire cavity. Once installed, the highly-flexed structural support element will deflect during use in a substantially conventional manner, as is represented by item number 200 in FIG. 3. As is also illustrated in FIG. 3, however, it is expected that the relative stress levels in a structural support element according to the present disclosure with differ significantly from the relative stress levels discussed above for known pre-curved bands. As described above with respect to pre-curved band 50, structural support element 200 will also include a ground contact patch 202 formed along a road or other surface 204. Additionally, similar conventions to those used in connection with FIG. 10 are used to describe FIG. 3, with inner surface stresses of structural support member 200 being represented by line 206 and outer surface stresses of the structural support member being represented by line 208. Furthermore, compression is represented in FIG. 3 by line portions disposed radially-inwardly from structural support element 200 and tension is represented by line portions disposed radially-outwardly from structural support element 200.

As mentioned above, coiling the initially-flat structural support element will generate the desired pre-stressed condition in the structural support element when installed. As a result, inner surface stresses 206 of a structural support element according to the subject disclosure are shown in FIG. 3 as being different from inner surface stresses 56 of known pre-curved band constructions in that in areas fore and aft of ground contact patch 202, inner surface stresses 206 are expected to be increased relative to inner surface stresses 56. Similarly, outer surface stresses 208 of a structural support element of the subject disclosure are shown as being different from inner surface stresses 58 of known pre-curved band constructions in that in areas fore and aft of ground contact patch 202, inner surface stresses 206 are also expected to be increased over stresses 56. Such increases in the subject structural support element will generally be attributable to lack of initial curvature and the overall pre-stressed condition of the subject structural support element when installed in a tire.

During operation and use of the tire, however, a portion of the pre-stressed structural support element will return to the approximately-flat initial condition when in the ground contact area 202 (i.e., will approximately match the road surface). As such, it is expected that this portion of the structural support element will be subjected to very low stresses (e.g., a near-zero stress level) when within the ground contact area. This is illustrated in FIG. 3 by lines 206 and 208 being disposed on-top-of or otherwise very near line 200 representing the structural support element. As such, tension/compression-type cyclic loading can be minimized or even avoided, which is expected to positively impact pressurized durability of the run-flat tire as well as under-pressurized or non-pressurized performance endurance. Additionally, if a positive obstacle were to be encountered by a run-flat tire utilizing the subject pre-stressed structural support element (e.g., structural inserts 104 and 104'), the resulting stresses in the ground contact area would be expected to be substantially lower in comparison to the resulting stresses in a pre-curved band under similar conditions.

One effect of the installation of such a pre-stressed structural support element within the tire casing is that the tire casing may be placed into tension by the structural element. This pre-stresses the tire casing and can act as a partial replacement of the normal operating pressure of the tire. During run-flat operation, the radial cords or wires of the tire function as spoke-like reinforcing elements and act as tension members to support vehicle loads. The radial spoke-like elements extend across the high-strength structural support element to form a load-sustaining structure, such as may be analogous to an elastic arch. Thus, the high-strength structural support element receives the loads from the radial cords or wires and carries these loads to the road or ground surface in compression and bending.

For convenience and ease of reading, reference will be primarily made hereinafter to length of strip material 134 without specific reference to length of strip material 134'. However, it is to be understood that any features, elements and/or other aspects discussed in connection with length of strip material 134 will be equally applicable to length of strip material 134'.

Figure 4:
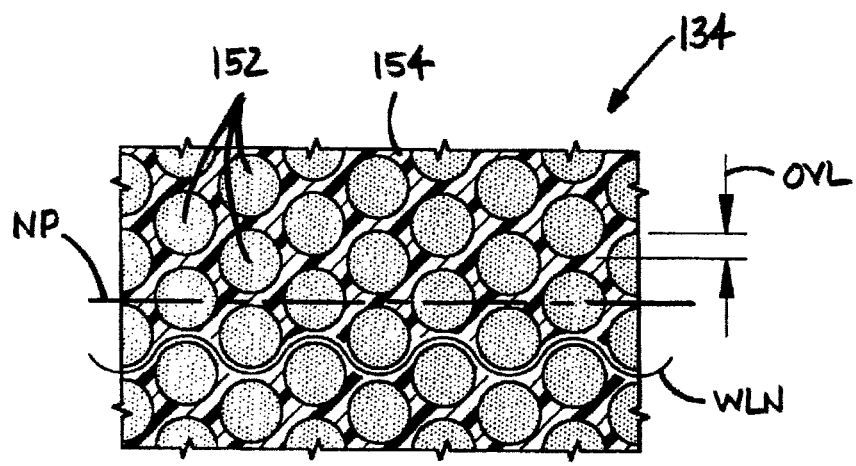
FIG. 4 is an enlarged diagrammatic cross-sectional side view of an exemplary length of strip material suitable for use as a structural insert in accordance with the subject matter of the present disclosure.

Length of strip material 134 can be formed from any suitable material or combination of materials and can be manufactured by way of any one or more processes or methods that may be suitable for generating elongated lengths of approximately planar material. In one preferred arrangement, length of strip material 134 is formed from a plurality of strand-like elements 152 that are at least partially encapsulated within a binder or matrix material 154, as shown in FIG. 4. At any given cross section, the plurality of strand elements may be arranged such that a nesting relationship is formed between the strand elements in one row and the strand elements in at least one row adjacent thereto, as indicated by reference dimension OVL. In this manner, at least some portion of the strand elements from each of two adjacent rows will overlap one another and might thereby help to avoid the formation of a plane or path that is formed only of matrix or resin material. As discussed hereinafter, it is desirable to avoid or minimize the formation of resin only planes that are in approximate alignment with a longitudinally-extending neutral plane NP of length of strip material 134. Rather, a path of resin or matrix material would follow wavy line WLN.

It will be recognized that any suitable binder or matrix material can be used, such as a thermoplastic or a thermoset, for example. Optionally, a toughening agent or other additives can be combined with the matrix material in a suitable quantity, such as from approximately 5 percent to about 40 percent, for example. One example of a suitable toughening agent that could be used is carboxy-terminated nitrile rubber (CTBN). Examples of toughened epoxy resins that may be suitable for use in forming a length of strip material in accordance with the subject disclosure are available from Hexion Specialty Chemicals of Columbus, Ohio under the trade name EPON.

Figure 5:
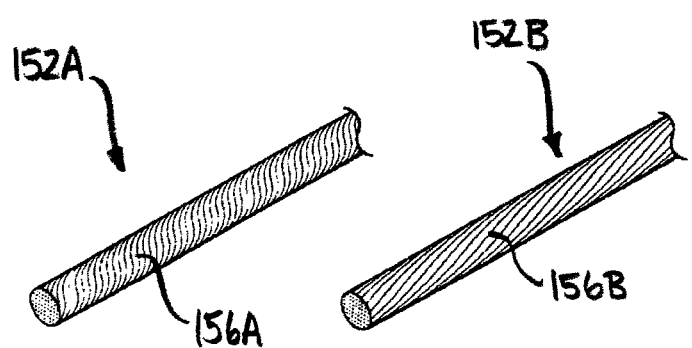
FIG. 5 is a diagrammatic perspective view of two exemplary twisted strand elements.

It will be appreciated that the plurality of strand-type elements can take any suitable shape, form, configuration and/or arrangement. For example, a strand element could take the form of a single filament (i.e., monofilament) formed from a single material. As another example, a strand element could be formed from a plurality of filaments or fibers that together form a strand element. Also, it will be appreciated that such a plurality of fibers can be in any configuration and/or arrangement, such as being braided or unbraided, twisted or untwisted, and/or free or attached fibers (i.e., a plurality of fibers that are adhesively connected to one another). For example, the plurality of strand elements used to form length of strip material 134 could optionally include one or more of strand elements 152A that are formed from fibers 156A, as shown in FIG. 5. Additionally, or in the alternative, the plurality of strand elements used to form length of strip material 134 could optionally include one or more of strand elements 152B that are formed from fibers 156B. It will be appreciated that strand elements 152A and 152B are twisted in a helical manner to different levels of tightness or degrees of twist. For example, fibers 156A could have a twist oriented at an angle to the circumference that is preferably within the range of approximately 20 degrees to approximately 60 degrees. As another example, fibers 156B could have a twist oriented at an angle to the circumference that is preferably within the range of approximately 0 degrees to approximately 25 degrees. However, it will be appreciated that strands of any suitable arrangement or combination of arrangements can be used.

Additionally, it will be appreciated that such a plurality of fibers can be formed from any suitable type or kind of material or combination of materials, such as, for example, fiberglass fibers, aromatic polyamide fibers, carbon fibers or any combination thereof. It will be further appreciated that such strand elements can be of any suitable length and/or cross-sectional dimension (e.g., width, thickness and/or diameter). As one example, a plurality of individual carbon fibers having a cross-sectional dimension (e.g., a diameter) within a range of approximately 0.00002 inches to 0.00005 inches could be used to form strand elements having a cross-sectional dimension (e.g., a diameter) within a range of approximately 0.0001 inches to 0.005 inches. A plurality of such strand elements could then be used to form a length of strip material, such as length of strip material 134, for example. It will be appreciated, however, that the foregoing example is merely illustrative and that any other suitable construction could alternately be used.

As discussed above, length of strip material 134 is preferably formed from a plurality of strand elements. It will be appreciated that any suitable number of strand elements can be used, such as from several hundred strand elements to many millions of strand elements, for example, depending upon the size, shape and construction of the length of strip material as well as the size, shape, construction and arrangement of the strand elements. For example, the number of strand elements used in forming a length of strip material can have a relation to a ratio of filament-to-matrix material that may be determined to be appropriate for the desired performance characteristics of the resulting length of strip material. While it will be appreciated that any suitable ratio can be used, one exemplary range includes ratios of from approximately 50/50 filament-to-matrix material to approximately 70/30 filament-to-matrix material, with a ratio of approximately 60/40 filament-to-matrix material being preferred.

Figure 6:
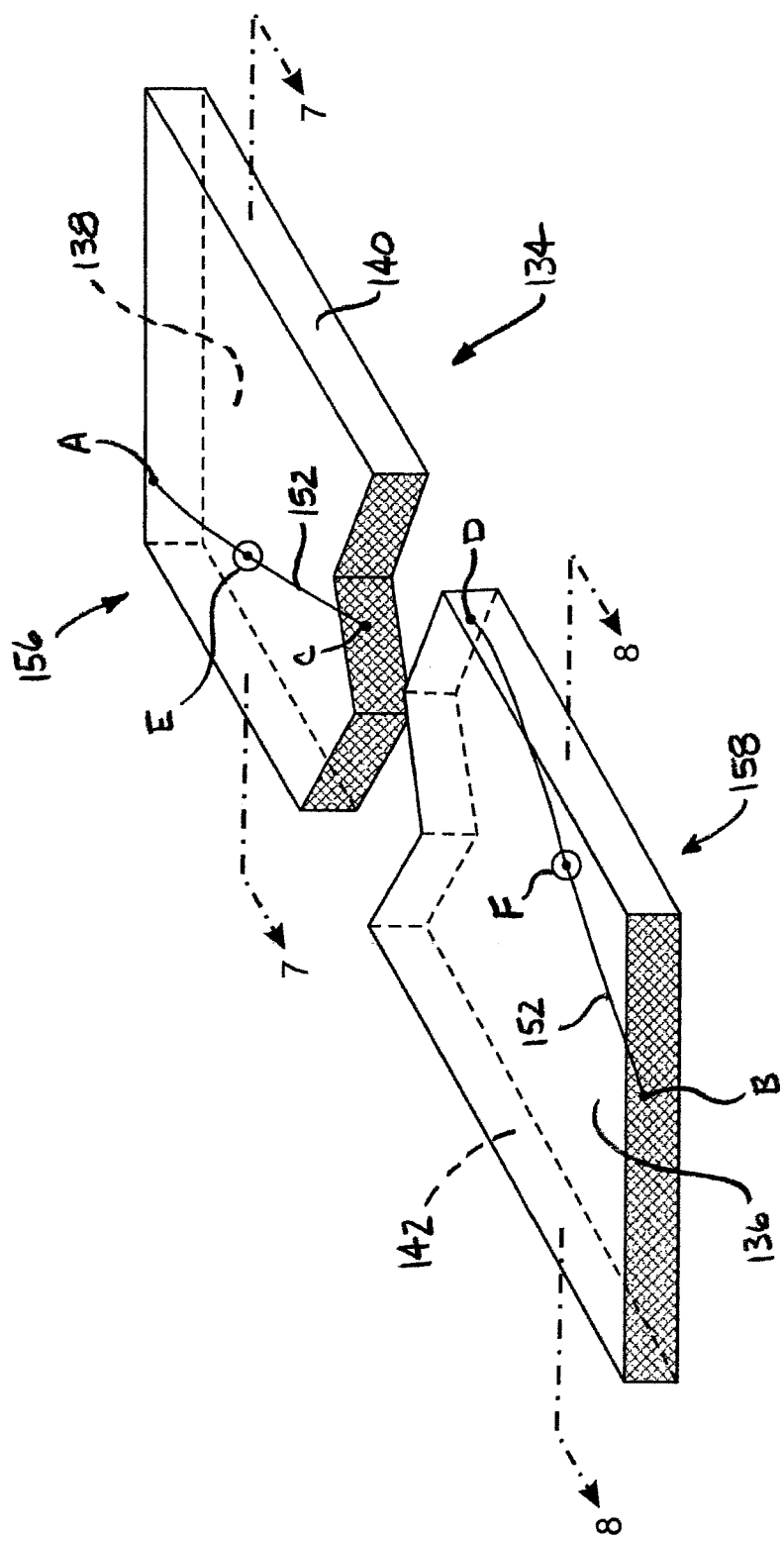
FIG. 6 is a diagrammatic perspective view of a section of one exemplary length of strip material in accordance with the subject matter of the present disclosure.

For purposes of clarity and ease of understanding, length of strip material 134 is shown in FIG. 6 with only a single strand element being illustrated and identified by item number 152. Strand element 152 extends from a first end 156 of the length of strip material to an opposing second end 158 thereof. It is preferred that each of the plurality of strand elements used to form the length of strip material extends the full length thereof. In some cases, however, a percentage of the plurality of strand elements may either begin or end within a given length of strip material. It will be appreciated that, for purposes of illustration only, both strand element 152 and length of strip material 134 are shown in FIG. 6 in a broken or discontinuous fashion, which assists in illustrating ends 156 and 158.

At first end 156 the beginning of strand element 152 is identified by reference character A in FIG. 6. Similarly, the end of strand element 152 at second end 158 is identified by reference character B. As discussed above, strand element 152 preferably extends continuously from the first end to the second end of the length of strip material. Due to the broken illustration of length of strip material 134 in FIG. 6, strand element 152 is shown with a section extending between reference characters C and D being omitted. It will be appreciated that the plurality of strand elements used to form length of strip material 134 can extend from first end 156 to second end 158 in any suitable manner and along any desired and/or resulting path, such as may be intended or otherwise occur during manufacturing.

It will be recognized that length of strip material 134 will be flexed in a lengthwise manner during use, which will result in the formation of a neutral axis extending widthwise across the length of strip material to define a neutral plane NP (FIGS. 4, 7 and 8) that extends lengthwise along the length of strip material. According to well understood principles, the strand elements and matrix material on one side of the neutral plane (e.g., the side of the neutral plane that includes first side 136) will be placed in tension and the strand elements and matrix material on the other side of the neutral plane (e.g., the side of the neutral plane that includes second side 138) will be in compression. It has been determined that increased performance of a structural insert (e.g., structural insert 104) can be achieved if the occurrence of resin only planes extending in approximate alignment with (e.g., approximately parallel to) the neutral plane are minimized or avoided. It will be appreciated, however, that the reduction or elimination of resin only planes can be achieved in any suitable manner.

As one example, a quantity of the plurality of strand elements can include a portion or lengthwise section that extends in the direction of the thickness of the length of strip material such that the generation of resin only planes, particularly those disposed in approximate alignment with the neutral plane, can be minimized or avoided. That is, at least some amount (i.e., a non-zero number) of the plurality of strand elements include at least a portion or lengthwise section that extends in a direction that is disposed at an angle to or otherwise not aligned with the neutral plane (e.g., at a non-zero angle with respect to the neutral plane). A non-zero number of the plurality of strand elements that are disposed at such an angle can, for example, be within a range of approximately 3 percent to approximately 99 percent of the plurality of strand elements. For example, a lengthwise portion of at least some quantity of the plurality of strand elements could extend along an approximately linear path but be disposed at non-zero angles to the neutral plane. As another example, a lengthwise portion of at least some quantity of the plurality of strand elements could extend along a curved or otherwise non-linear path with respect to the thickness of the length of strip material and, thus, have a directional component that extends in the thickness direction. In either case, a lengthwise portion of at least some quantity of the plurality of strand elements will include a change in relative position and/or orientation with respect to at least the direction of thickness (e.g., thicknesses ST1 and ST2) of the length of strip material. What's more, in some cases, a lengthwise portion of at least some number of the plurality of strand elements may extend across the neutral plane. That is, a lengthwise portion of at least some quantity of the plurality of strand elements can extend from along one side of the neutral plane, across the neutral plane to the other side thereof.

Figure 7:
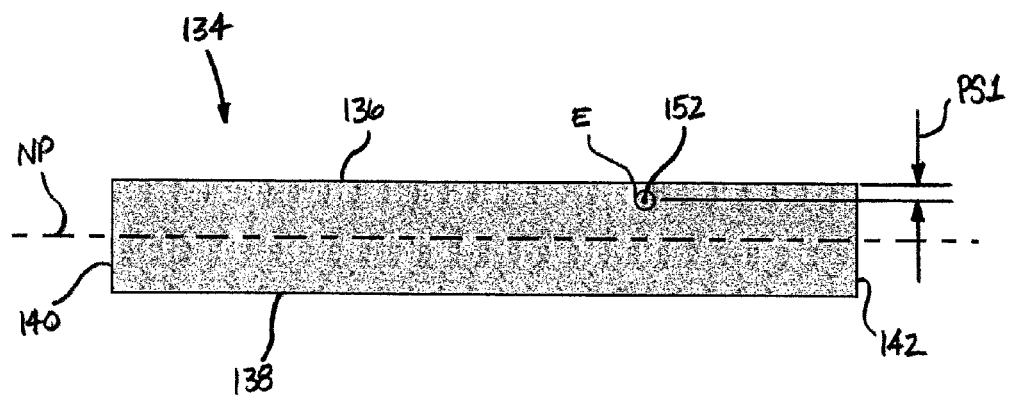
FIG. 7 is a diagrammatic cross-sectional side view of the exemplary structural insert in FIG. 6 taken at section 7-7 thereof.
Figure 8:
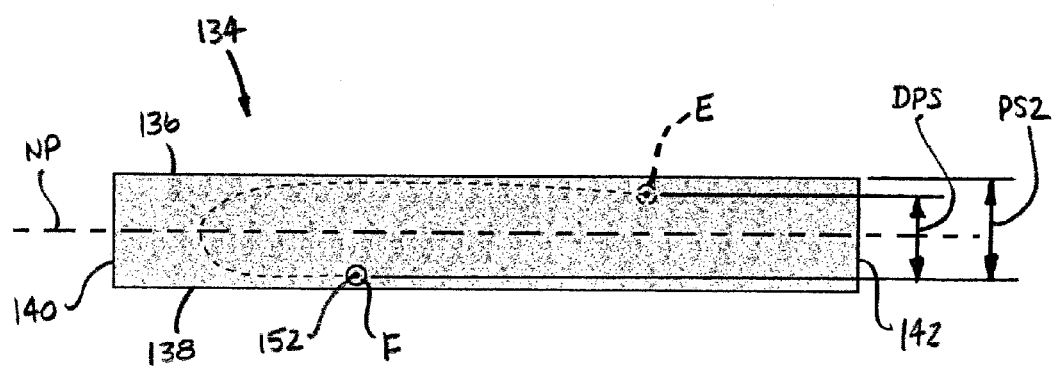
FIG. 8 is a diagrammatic cross-sectional side view of the exemplary structural insert in FIG. 6 taken at section 8-8 thereof.

An example in which a lengthwise portion of a quantity of the plurality of strand elements has a curved or otherwise non-linear path is illustrated in FIGS. 6-8. As discussed above with respect to FIG. 6, strand element 152 extends lengthwise along length of strip material 134 between first and second ends 156 and 158, as indicated by reference points A and B. Strand element 152 is shown in FIGS. 6 and 7 as having a relative position, at a reference point E, with respect to the thickness of the length of strip material, as is indicated by reference dimension PS1 (FIG. 7). Strand element 152 shown in FIGS. 6 and 8 as having a relative position, at a reference point F, with respect to the thickness of the length of strip material, as is indicated by reference dimension PS2 (FIG. 8). As such, at least a lengthwise portion of strand element 152 is shown extending in the direction of the thickness of length of strip material 134. This results is a variation or change in the relative orientation or thickness position of strand element 152, as is indicated by reference dimension DPS in FIG. 8.

In the arrangement shown in FIGS. 6-8, strand element 152 extends along a non-linear and/or non-uniform path that crosses from along one side of neutral plane NP to along the other side of the neutral plane at least once. It will be recognized, however, that, in practice, some number or quantity of strand elements may be disposed in approximate alignment with the neutral plane, some other number or quantity of strand elements may have a lengthwise portion that includes a relatively small change in position with respect to the thickness of the length of strip material, and still some further number of strand elements may have a lengthwise portion that extends across the neutral axis. As a result, the foregoing construction and/or arrangement will likely result in the desired minimization of resin only planes in the length of strip material. And, it is expected that performance of the structural insert will increase as the number or quantity of strand elements that are in the latter two categories increases.

It is indicated above that inner surface stresses 206 and outer surface stresses 208 of the subject structural insert are increased over the inner and outer surface stresses of known pre-curved bands. However, it will be appreciated that the use of a composite construction for the length of strip material, such as that discussed above, for example, is expected to result in a structural insert having operating stresses within the endurance fatigue limit of the material. As one example, such a material may provide a stiffness equivalent within a range of approximately $25 \times 10^6$ lbs-in$^2$ to approximately $30 \times 10^6$ lbs-in$^2$ (Young's Modulus×moment of inertia).

As indicated above, length of strip material 134 can be formed or otherwise manufactured using any one or more processes or methods. One example of a suitable process is commonly referred to as a pultrusion process, which utilizes well established and existing technology. The utilization of the pultrusion process may result in reduced manufacturing costs associated the fabrication of the length of strip material. Another benefit of the use of a longitudinally-extending and approximately flat length of strip material is that the use of unique or specially designed mandrels can be avoided, whereas such mandrels are normally used in forming known pre-curved bands.

Figure 11:
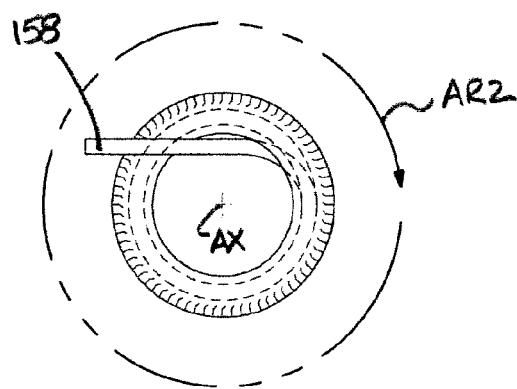

Turning, now, to FIGS. 9-11, a sequence of illustrations are shown corresponding to a process of installing length of strip material 134 (or 134') into the cavity of pneumatic tire 102. In FIG. 9, first end 156 of the length of strip material, which is in an approximately flat or an optional curved arrangement, is introduced into the cavity of pneumatic tire 102. Relative rotation between length of strip material 134 and pneumatic tire 102 results in deflection of first end 156 of the length of strip material as the same makes contact with the inner surface of the elastomeric casing, as shown in FIG. 10. It will be appreciated that the relative rotation can be accomplished in any suitable manner, such as by rotating the pneumatic tire about an axis AX as indicated by arrow AR1, for example. As the relative rotation between the length of strip material and the pneumatic tire continues, such as is represented by arrow AR2, the length of strip material can be fed, in the direction of arrow AR3 (FIG. 10), into the cavity of the tire until second end 158 is reached and the entire length of strip material is helically arranged within the tire cavity, as shown in FIG. 11.

Figure 12:
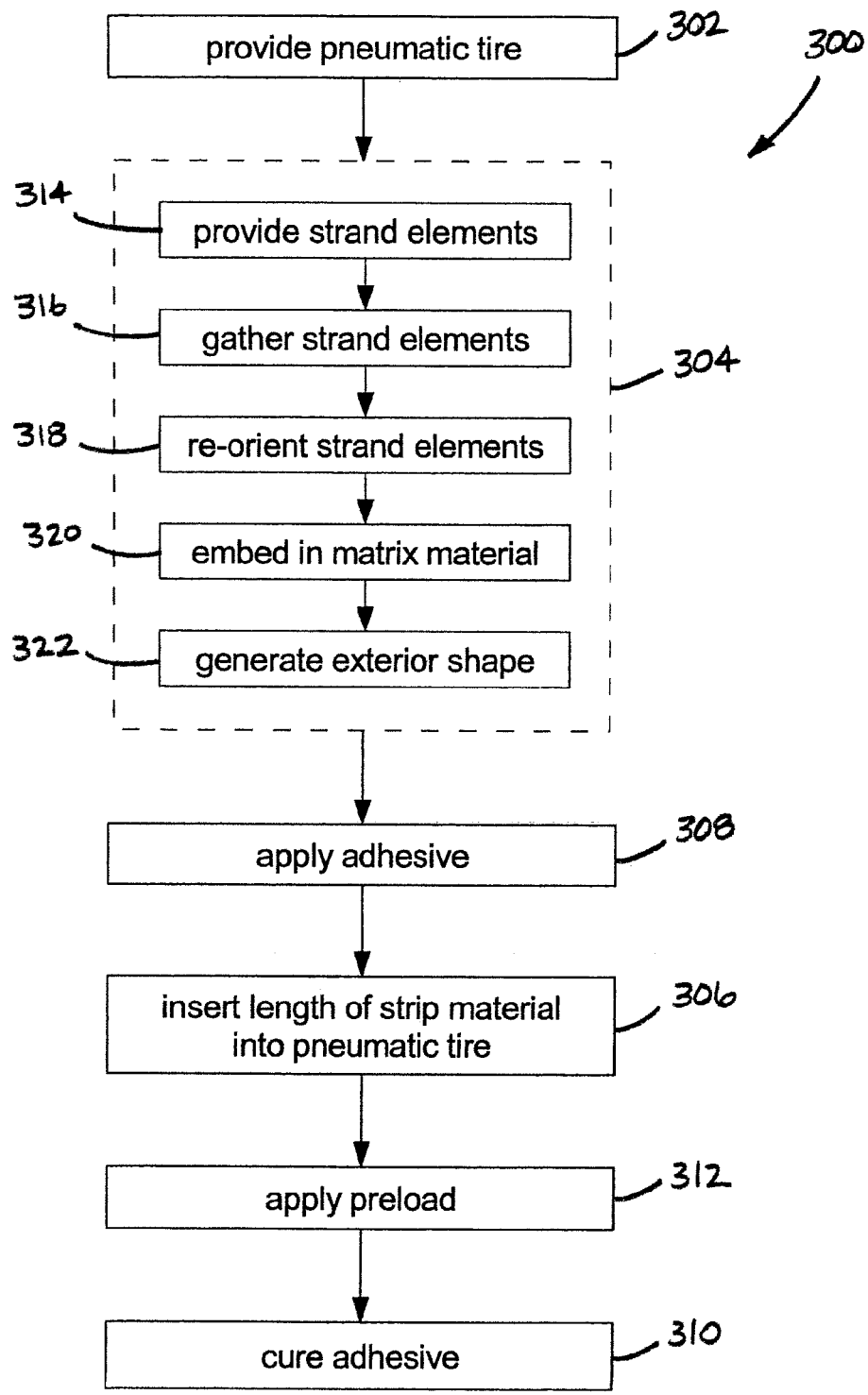
FIG. 12 graphically represents one exemplary method of making a pneumatic tire and structural insert assembly in accordance with the subject matter of the present document.
Figure 13:
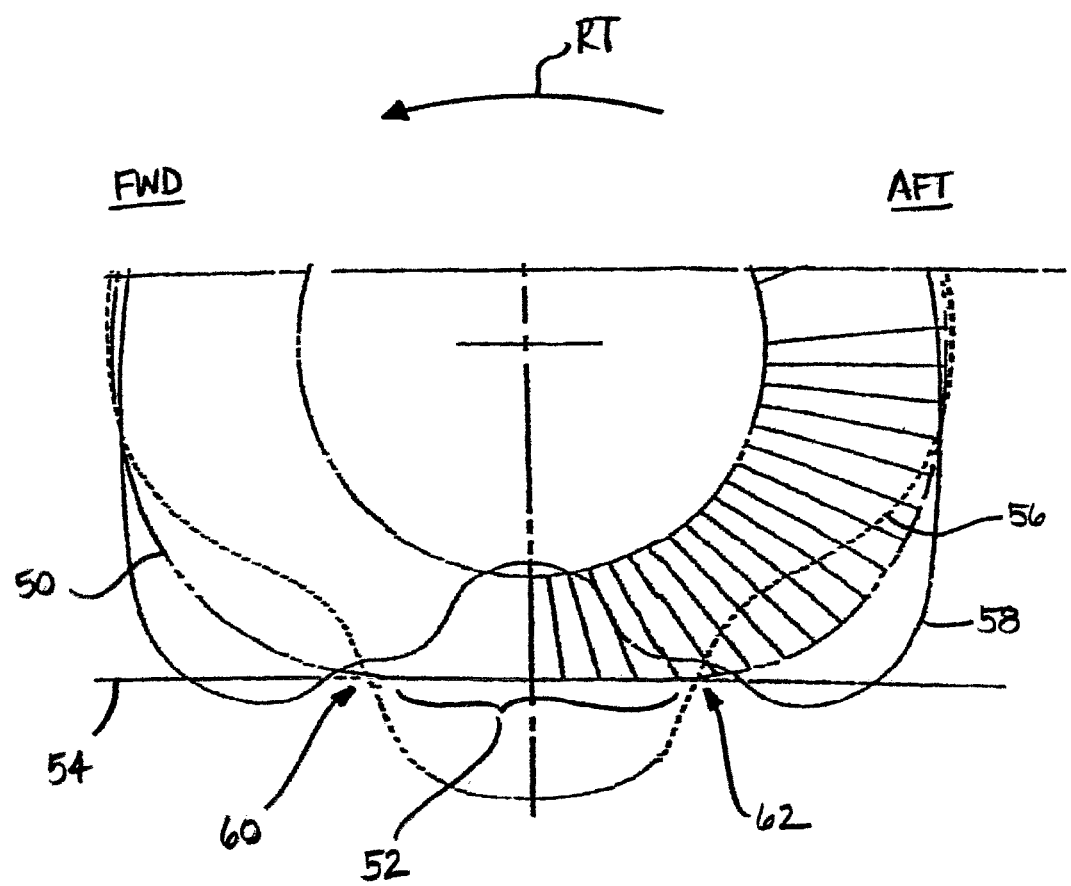
FIG. 13 is a graphical representation of a known run-flat pneumatic tire illustrating exemplary stresses experienced thereby during run-flat operation.

FIG. 12 is a graphical representation of one exemplary method 300 of manufacturing a run-flat pneumatic tire assembly in accordance with the subject matter of the present disclosure, such as pneumatic tire assembly 100, for example. Method 300 includes providing a cured, finished or otherwise complete pneumatic tire, such as a conventional radial tire, for example, as indicated in box 302. Method 300 also includes forming a length of strip material, such as length of strip material 134 or 134', for example, by way of a suitable manufacturing process, as indicated in box 304. Additionally, method 300 includes inserting the length of strip material into the cavity of the pneumatic tire in a helical arrangement to form a pre-stressed structural insert suitable for permitting operation of the pneumatic tire in under-inflated or non-inflated conditions, as indicated in box 306.

Method 300 can optionally include securing the length of strip material on or along an inner surface of the pneumatic tire. Such a securement action can be performed in any suitable manner and by way of any suitable materials and/or devices. For example, an adhesive (not shown) could be interposed between the outer surface of the length of strip material and the inner surface of the casing of the pneumatic tire to produce an interconnection therebetween, such as is indicated by box 308. By securing the length of strip material on or along the inner surface of the pneumatic tire, the tire reinforcing elements act to create a composite beam structure with the reinforcing elements constituting an outer cap and the length of strip material forming the inner cap. In such an arrangement, a length of strip material having a reduced strip material thickness may be used. Additionally, it will be appreciated that any suitable adhesive substance or material could be used, such as a heat activated adhesive material. As such, method 300 can also optionally include heat curing the adhesive material to secure the length of strip material on or along the inner surface of the tire, as indicated in box 310.

Method 300 can also optionally include preloading the structural insert and pneumatic tire prior to the length of strip material that forms the structural insert being secured on or along the pneumatic tire, as is indicated in box 312. Such a preloading action can be accomplished in any suitable manner. For example, an innertube can be placed within the tire cavity of the elastomeric casing after the length of strip material has been inserted. The innertube can then be pressurized to a suitable pressure level, such as approximately twice the rated tire pressure, for example, to expand the elastomeric casing and preload the structural insert and the reinforcing elements of the tire. A parting surface, such as a suitable spray film, for example, can be applied on or along the innertube to minimize adhesion.

As discussed above, a length of strip material, such as length of strip material 134 or 134', for example, can be formed in any suitable manner and through the use of any suitable actions or processes. As one example, the action of forming a length of strip material represented by box 304 of method 300 can include providing a plurality of strand elements, as indicated by box 314. It will be appreciated that the plurality of strand elements can be provided in any suitable manner, such as by supplying extended lengths of filament material (e.g., monofilament or numerous individual filaments) on a plurality of creels or spools, for example. The action of forming a length of strip material represented by box 304 can also include gathering the plurality of strand elements into a bundle as the filament material is feed from the plurality of creels or spools, as is indicated by box 316. The extended lengths of filament material can act to supply substantially continuous lengths of strand elements that can be substantially continuously gathered into a bundle.

The action of forming a length of strip material represented by box 304 of method 300 can further include an optional action of varying or otherwise re-orienting at least a portion of the plurality of strand elements, as indicated by box 318 in FIG. 12. Such an action can be accomplished in any suitable manner, such as by continuously twisting the bundle of strand elements through a suitable angle with respect to the circumference of the bundle, for example. While it will be appreciated that any suitable angle of twist could be used, one exemplary range is from approximately 1 degree to approximately 20 degrees, with an angle of approximately 10 degrees being preferred.

The action of forming a length of strip material represented by box 304 of method 300 can further include an action of embedding or otherwise encapsulating the plurality of strand elements in a binder or matrix material, as indicated by box 320 in FIG. 12. Again, it will be appreciated that this can be accomplished in any suitable manner, such as by coating the plurality of strand elements in the matrix material at one or more points in the process. An optional step of sizing the plurality of strand elements (or the filament material thereof) can also be included, such as to improve the wetting of the strand elements by the matrix material. The action of forming a length of strip material represented by box 304 of method 300 can still further include an action of generating an exterior shape of the length of strip material, as indicated by box 322, such as by pulling the plurality of strand elements and matrix material through a suitable die arrangement, for example.

As used herein with reference to certain elements, components and/or structures (e.g., "first sidewall" and "second sidewall"), numerical ordinals merely denote different singles of a plurality and do not imply any order or sequence unless specifically defined by the claim language.

While the subject novel concept has been described with reference to the foregoing embodiments and considerable emphasis has been placed herein on the structures and structural interrelationships between the component parts of the embodiments disclosed, it will be appreciated that other embodiments can be made and that many changes can be made in the embodiments illustrated and described without departing from the principles of the subject novel concept. Obviously, modifications and alterations will occur to others upon reading and understanding the preceding detailed description. Accordingly, it is to be distinctly understood that the foregoing descriptive matter is to be interpreted merely as illustrative of the present novel concept and not as a limitation. As such, it is intended that the subject novel concept be construed as including all such modifications and alterations insofar as they come within the scope of the appended claims and any equivalents thereof.

The invention claimed is:

1. A method of making a run-flat pneumatic tire assembly, said method comprising:
    a) providing a pneumatic tire including an elastomeric casing having a crown and opposing sidewalls, said crown including an outer surface and an inner surface that at least partially defines a tire cavity;
    b) providing a longitudinally-extending and approximately-planar length of strip material having first and second longitudinally-extending sides defining a strip material thickness and opposing longitudinally-extending edges defining a strip material width with a first stress level along said first side, said length of strip material including a plurality of strand elements and a matrix material at least partially encapsulating said plurality of strand elements; and,
    c) inserting said length of strip material into said tire cavity in a helical arrangement such that said first longitudinally-extending side is facing outwardly toward said inner surface of said crown portion and thereby at least partially forming a structural insert that is pre-stressed due at least in part to a reactive force applied to said helical arrangement of said approximately planar length of strip material within said tire cavity by said tire with said reactive force maintaining said length of strip material in said helical arrangement resulting in a second stress level along said first side that is greater than said first stress level.

2. A method according to claim 1 further comprising securing said length of strip material in said helical arrangement along said inner surface of said crown portion of said tire.

3. A method according to claim 2, wherein securing said length of strip material includes applying an adhesive along at least one of said first side of said length of strip material and said inner surface of said crown portion, and affixing said length of strip material along said inner surface using at least said adhesive.

4. A method according to claim 2 further comprising applying pressure to said elastomeric casing and said length of strip material from within said tire cavity to expand and thereby tension said elastomeric casing and said length of strip material prior to securing said length of strip material in said helical arrangement along said inner surface of said elastomeric casing.

5. A method according to claim 1, wherein inserting said length of strip material in c) includes forming a plurality of coils from said length of strip material to form said helical arrangement.

6. A method according to claim 5, wherein forming said plurality of coils includes abuttingly engaging opposing edges of adjacent coils.

7. A method according to claim 5, wherein forming said plurality of coils includes axially-spacing said plurality of coils from one another to form a gap between opposing edges of adjacent coils.

8. A method according to claim 7 further comprising installing one or more spacer elements along said gap between said opposing edges of said adjacent coils to maintain axial spacing between said adjacent coils.

9. A method according to claim 1, wherein providing a longitudinally-extending and approximately-planar length of strip material in b) includes forming a longitudinally-extending and approximately-planar length of strip material by at least gathering said plurality of strand elements into a bundle and forming said bundle into a cross-sectional shape having said strip material thickness and said strip material width.

10. A method according to claim 9, wherein forming a longitudinally-extending and approximately-planar length of strip material includes twisting said bundle of said plurality of strand elements such that a non-zero percentage of said plurality of strand elements have a lengthwise portion with a directional component extending in approximate alignment with said strip material thickness.

11. A method according to claim 1, wherein inserting said length of strip material in c) includes forming a structural insert with said reactive force resulting in a theoretical neutral plane being established along said length of strip material between said first and second sides thereof with said first side of said length of strip material being in tension and said second side of said length of strip material being in compression.

12. A method of making a run-flat pneumatic tire assembly, said method comprising:
   a) providing a pneumatic tire including an elastomeric casing having a crown and opposing sidewalls, said pneumatic tire including an inner surface and an outer surface, said inner surface at least partially defining a tire cavity, and said outer surface capable of forming a ground contact patch during use on an associated ground surface;
   b) providing a longitudinally-extending and approximately-planar length of strip material having first and second longitudinally-extending sides defining a strip material thickness and opposing longitudinally-extending edges defining a strip material width, and a first stress level along said first side and a second stress level along said second side; and,
   c) inserting said length of strip material into said tire cavity in a helical arrangement such that said first side is facing outwardly toward said inner surface to at least partially form a structural insert that is pre-stressed by a reactive force applied to said helical arrangement within said tire cavity by said tire acting against said structural insert and preventing said structural insert from returning to a longitudinally-extending and approximately planar shape.

13. A method according to claim 12, wherein inserting said length of strip material in c) includes forming a structural insert with said reactive force resulting in a third stress level along said first side and a fourth stress level along said second side, said third stress level being a tensile stress that is greater than said first stress level, and said fourth stress level being a compressive stress that is greater than said second stress level.

14. A method according to claim 12, wherein inserting said length of strip material in c) includes forming a structural insert with said reactive force resulting in a theoretical neutral plane being established along said length of strip material between said first and second sides thereof with said first side of said length of strip material being in tension and said second side of said length of strip material being in compression.

15. A method according to claim 14, wherein providing a longitudinally-extending and approximately-planar length of strip material in b) includes forming a longitudinally-extending and approximately-planar length of strip material from a plurality of strand elements and a matrix material at least partially encapsulating said plurality of strand elements with a non-zero percentage of said plurality of strand elements having a lengthwise portion extending at a non-zero angle with respect to said neutral plane thereby minimizing formation of matrix-only planes that extend in approximate alignment with said neutral plane.

16. A method according to claim 15, wherein forming said longitudinally-extending and approximately planar length of strip material includes orienting said plurality of stand elements such that said non-zero percentage of said plurality of strand elements is within a range of from approximately 3 percent to approximately 99 percent.

17. A method according to claim 15, wherein forming said longitudinally-extending and approximately planar length of strip material includes orienting said plurality of stand elements such that said lengthwise portions of said non-zero percentage of said plurality of strand elements extend in a non-uniform and curvilinear manner along said length of strip material.

18. A method according to claim 12, wherein inserting said length of strip material in c) includes forming a plurality of coils from said length of strip material to form said helical arrangement with adjacent ones of said plurality of coils disposed in spaced relation to one another such that a gap is formed between opposing edges of adjacent coils.

19. A method according to claim 18 further comprising providing a spacer member including a plurality of spacer elements that are disposed from one another at a distance approximately equal to said strip material width, said spacer member disposed along said second side of said helically-arranged length of strip material such that a different one of said plurality of spacer elements is disposed within a gap between adjacent coils of said structural insert.

20. A method according to claim 12 further comprising securing said length of strip material to said pneumatic tire, securing said length of strip material including disposing an adhesive material between said first side of said length of strip material and said inner surface of said pneumatic tire and applying pressure to said pneumatic tire and said length of strip material from within said tire cavity to expand and thereby tension said pneumatic tire and said length of strip material prior to securing said length of strip material in said helical arrangement along said inner surface.

\* \* \* \* \*